O. M. ECKARDT.
SNOW REMOVING DEVICE.
APPLICATION FILED JULY 30, 1914.

1,154,388.

Patented Sept. 21, 1915.
2 SHEETS—SHEET 1.

WITNESSES

INVENTOR
OTTO M. ECKARDT
BY
ATTORNEYS

O. M. ECKARDT.
SNOW REMOVING DEVICE.
APPLICATION FILED JULY 30, 1914.

1,154,388.

Patented Sept. 21, 1915.
2 SHEETS—SHEET 2.

WITNESSES

INVENTOR
OTTO M. ECKARDT,

BY

ATTORNEYS

UNITED STATES PATENT OFFICE.

OTTO MAGNUS ECKARDT, OF DOVER, NEW JERSEY.

SNOW-REMOVING DEVICE.

1,154,388.   Specification of Letters Patent.   Patented Sept. 21, 1915.

Application filed July 30, 1914.  Serial No. 854,071.

*To all whom it may concern:*

Be it known that I, OTTO M. ECKARDT, a subject of the Emperor of Germany, and a resident of Dover, in the county of Morris and State of New Jersey, have invented a new and useful Improvement in Snow-Removing Devices, of which the following is a specification.

My invention is an improvement in snow removing devices, and has for its object to provide a self-propelled and self-operated device of the character specified, wherein a wheeled supporting frame is provided, having a scoop for picking up the snow and having conveyers for receiving the scooped up snow and delivering it at a distance from the place where it is taken up.

Figure 1:
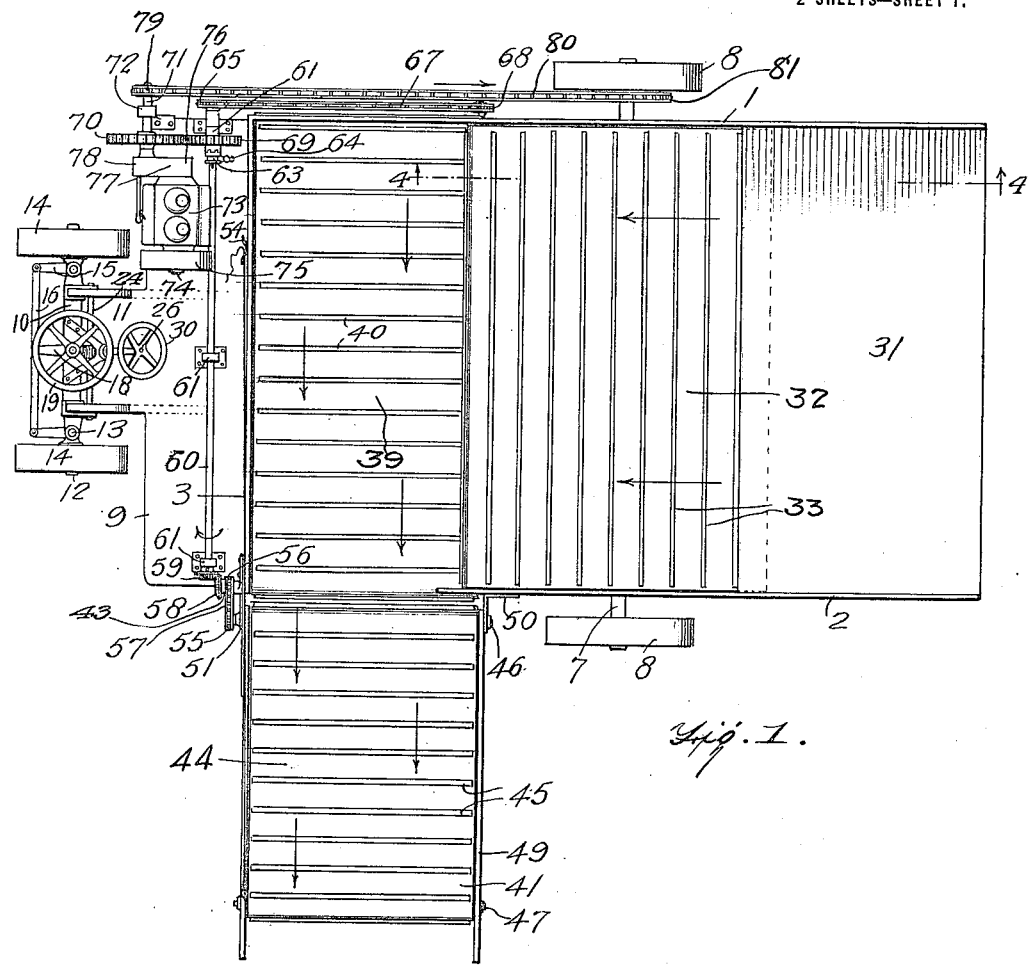
Figure 2:
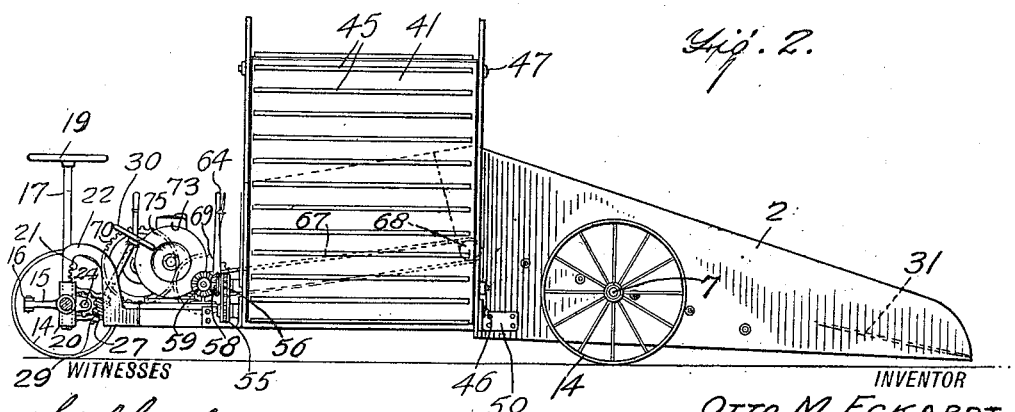

In the drawings: Figure 1 is a top plan view of the device, Fig. 2 is a side view, Fig. 3 is a front view, Fig. 4 is a section on the line 4—4 of Fig. 1, looking in the direction of the arrows adjacent to the line, and Fig. 5 is a section on the line 5—5 of Fig. 3, looking in the direction of the arrows adjacent to the line.

The present embodiment of the invention comprises a wheel supported frame, consisting of side plates 1 and 2, a rear end plate 3 and cross plates and bars 4, 5 and 6, respectively. An axle 7 is journaled transversely of the frame, and wheels 8 are journaled on the ends of the axle, the said wheels being the front wheels for supporting the frame.

A platform 9 extends rearwardly from the end plate 3, and a rear axle 10 is arranged transversely of a central extension 11 from the platform, and is connected thereto in a manner to be presently described. Spindles 12 are pivoted to the ends of the axle as indicated at 13, and wheels 14 are journaled on the spindles. Each spindle is provided with a rearwardly extending radial arm 15, and the arms are connected by a coupling bar 16. It will be evident that when the coupling bar 16 is moved longitudinally, the spindles may be swung in opposite directions to guide the machine.

A steering shaft 17 is journaled in vertical position at the center of the rear axle 10, and below the axle the shaft is provided with a radial rearwardly extending arm 18, which is pivoted at its rear end to the center of the bar 16. A wheel 19 is secured to the upper end of the shaft, and it will be evident that when the wheel is turned in the proper direction, the wheels 14 will be turned to guide the machine.

The axle is provided at each end with a vertical sleeve 20, and rack bars 21 connected to the extension 11 of the platform, engage the sleeves, the said rack bars being slidable in the sleeves. The rack bars are connected to the extension by means of upwardly and rearwardly curved arms 22, the arrangement being such that the rear end of the machine may be adjusted vertically by moving the rack bars 21 in the sleeves.

Each of the sleeves 20 is open forwardly, and a pinion 23 is provided for engaging each sleeve, each of the pinions extending through the opening at the front of the sleeve to engage the teeth of the rack bar. The pinions 23 are keyed to the ends of a shaft 24, which is journaled in bearings 25 in rear of the axle, and a worm wheel 25 is keyed to the shaft at its center.

A shaft 26 is journaled in a bearing 27, supported by inclined bracket arms 28 in front of the shaft 24, and at its lower end the shaft is provided with a worm 29, which engages the worm wheel 25 on the shaft 24. A wheel 30 is secured to the upper end of the shaft 26, and it will be evident that when the shaft is turned in the proper direction, the rear end of the machine may be raised or lowered with respect to the axle. When the wheel is turned in one direction the rack bars 21 are lifted while when the wheel is turned in the other direction the rack bars are lowered and since the rack bars are rigid with the machine frame the frame is adjusted simultaneously with the rack bars.

At the front of the frame a plate 31 is arranged, the said plate inclining downwardly toward its outer free edge, and the side plates 1 and 2 are connected to the ends of the plate. The plate 31 is supported by the cross bars 5 and 6, before mentioned, and the outer free edge thereof is beveled to form a cutting edge for cutting beneath the snow to be removed. The inner edge of the plate extends over the lower end of an endless carrier supported between the side plates. The said carrier comprises an endless belt 32, provided with transverse slats 33 on its outer face, the slats being spaced apart at regular intervals. Sprocket chains 34 are connected with the under face of the belt, and the said chains are engaged by sprocket wheels 35, secured on shafts 36, journaled transversely of the frame between the plates 1 and 2. The rear shaft 36 is at a higher level than the front shaft 36 and the said front shaft 36 is directly below the rear end of the plate 31.

The upper run of the carrier is supported by rollers 37 on shafts 38, arranged transversely of the frame between the side plates. At its upper end the endless carrier just described, delivers to a second carrier arranged transversely of the frame between the side plates 1 and 2 and adjacent to the end plate 3. The said carrier comprises an endless belt 39, which is provided on its outer face with spaced transverse slats 40, and sprocket chains 41 are secured to the inner face of the belt. The said chains engage sprocket wheels 42 on shafts 43, which are journaled in the end plate 3 and in the cross plate 4.

The endless carrier just described, extends from the side plate 1, slightly beyond the side plate, and the said plate is cut away adjacent to the endless carrier to permit the passage of the snow from the carrier to a delivery carrier arranged at the side of the frame and adjustable with respect thereto. This carrier comprises an endless belt 44, having secured to its outer face at spaced intervals transverse slats 45. The belt is supported by end rollers 46 and 47, and by intermediate rollers 48. The rollers are journaled between plates 49, arranged in lateral spaced relation, and each of the said plates is hinged at its inner end on the shaft of the roller 46.

An angle plate 50 has one of its portions secured to the outer face of the side plate 2 at the plate 49, and the other portion is provided with an opening for receiving the shaft of the roller 46. The opposite end of the shaft of the roller is journaled in a bracket plate 51, secured to the outer face of the end plate 3, and a flexible member 52 is connected at one end with an eye 53, on one of the side plates 49, the other end being adapted for engagement with a cleat 54 on the end plate 3, near the end remote from the carrier.

The outer end of the shaft 46 at the plate 51 is provided with a sprocket wheel 55, and this wheel is connected to a wheel 56 on the extended end of the adjacent shaft 43, by means of a sprocket chain 57. The said extended end of the shaft is also provided with a bevel gear 58, which meshes with a bevel gear 59 on the adjacent end of the operating shaft 60. This shaft 60 is journaled in bracket arms 61 on the platform 9, and the said shaft is provided with the movable portion 63 of a clutch, the said portion being splined on the shaft as shown and being arranged on the opposite end from the bevel gear 59.

The fixed section of the clutch is carried by the hub of a pinion 69, and the movable portion is moved toward and from the fixed portion by means of a lever 64 in the usual manner. The gear wheel 69 meshes with the gear wheel 70 on a shaft 71, journaled parallel with the shaft 60 and in rear of the same in bearings 72 on the platform, and the shaft 71 is connected to the motor shaft 74 of a motor 73, by means of a belt 77. The belt engages a pulley 76 on the motor shaft and a pulley 78 on the shaft 71. The motor in the present instance is an explosion engine, and a fly wheel 75 is secured to the end of the shaft 74 remote from the pulley 76.

It will be evident that when the clutch 63 is connected to the clutch of the gear wheel 69, the shaft 60 will be driven by the motor through the shaft 71. This shaft 60 drives the shaft 46, and the shaft 43, thus operating the endless carriers 44 and 39. In addition the shaft 60 drives the endless carrier 32, being connected to the shaft 36 at the upper end thereof by means of a sprocket chain 67, which connects sprocket wheels 65 and 68, on the shafts 60 and 36, respectively.

The shaft 71 drives the front axle 7, thus moving the machine. A sprocket wheel 79 is secured to the outer end of the shaft 71, and a chain 80 connects this wheel with a similar wheel 81 on the axle 7.

In operation, the machine is driven through the streets or other places where the snow is to be removed, and the rear end of the frame is elevated by means of the wheel 30 to cause the front edge of the plate to cut beneath the snow. As the machine moves forwardly the snow will ride up on the upper face of the plate 31, and will pass over the rear edge of the same on to the endless carrier comprising the endless belt 32. This carrier will deliver the snow to the carrier having the belt 39, and the direction of motion of the snow will be changed from longitudinally of the machine to transversely thereof.

The endless carrier last mentioned, delivers to the carrier having the belt 44 and by means of the flexible member 52 the outer end of this carrier may be adjusted to deliver to a wagon or cart by means of which the snow is taken to any desired point. The amount of snow removed may be varied by raising or lowering the rear end of the machine.

The motor drives the shaft 71 and the shaft 71 drives the front axle and moves the wheels forwardly. Thus the machine is propelled and operated by its own power.

I claim:—

In a snow removing machine comprising a platform having a scoop at its front end, wheels journaled on an axis transverse to the platform intermediate the ends thereof, a rear axle, wheels on the axle to swing on vertical axes, a common means for moving the wheels and an adjustable connection between the rear end of the platform and the rear axle for varying the inclination of the platform, said connection comprising arch bars at the rear of the platform and having depending rack bars, the axle having guides for the bars, a shaft journaled longitudinally of the axle and having pinions for engaging the rack bars, the guides having openings through which the pinions extend, and means for oscillating the shaft.

OTTO MAGNUS ECKARDT.

Witnesses:
  RANKINS MILLER,
  JOHN W. HUMMER.